(12) United States Patent
Gaemers

(10) Patent No.: US 8,053,482 B2
(45) Date of Patent: Nov. 8, 2011

(54) FISCHER-TROPSCH CATALYST

(75) Inventor: Sander Gaemers, East Riding of Yorkshire (GB)

(73) Assignee: BP Exploration Operating Company Limited, Middlesex (GB)

( * ) Notice: Subject to any disclaimer, the term of this patent is extended or adjusted under 35 U.S.C. 154(b) by 77 days.

(21) Appl. No.: 12/448,373

(22) PCT Filed: Dec. 18, 2007

(86) PCT No.: PCT/GB2007/004865
§ 371 (c)(1), (2), (4) Date: Jun. 18, 2009

(87) PCT Pub. No.: WO2008/075030
PCT Pub. Date: Jun. 26, 2008

(65) Prior Publication Data
US 2010/0093876 A1    Apr. 15, 2010

(30) Foreign Application Priority Data
Dec. 19, 2006 (EP) .................... 06256435

(51) Int. Cl.
*C07C 27/00* (2006.01)
(52) U.S. Cl. ................... 518/715; 518/700
(58) Field of Classification Search ........ 518/700, 518/715
See application file for complete search history.

(56) References Cited

U.S. PATENT DOCUMENTS

| | | | |
|---|---|---|---|
| 4,107,091 A | 8/1978 | Khera | |
| 4,280,930 A | 7/1981 | Antos | |
| 4,826,800 A * | 5/1989 | McAteer | 502/303 |
| 5,102,851 A * | 4/1992 | Eri et al. | 502/302 |
| 2003/0027874 A1 | 2/2003 | Herron et al. | |

FOREIGN PATENT DOCUMENTS

| | | |
|---|---|---|
| EP | 0 261 870 | 3/1988 |
| FR | 2254539 | 7/1975 |
| WO | 01/76735 | 10/2001 |
| WO | 02/096836 | 12/2002 |
| WO | 03/090925 | 11/2003 |
| WO | 2005/105299 | 11/2005 |

OTHER PUBLICATIONS

International Search Report for PCT/GB2007/004865, mailed Jun. 10, 2008.
Written Opinion of the International Searching Authority for PCT/GB2007/004865, mailed Jun. 10, 2008.
International Preliminary Report on Patentability for PCT/GB2007/004865, mailed May 18, 2009.

* cited by examiner

*Primary Examiner* — Jafar Parsa
(74) *Attorney, Agent, or Firm* — Nixon & Vanderhye

(57) ABSTRACT

Process for reducing the methane selectivity in a Fischer-Tropsch conversion of syngas to hydrocarbons, by using a catalyst composition containing (i) cobalt, either as the elemental metal, oxide, or a compound thermally decomposable to the elemental metal or oxide, (ii) zinc, in the form of the oxide or a compound thermally decomposable to the oxide, and (iii) platinum, in the elemental metal form, or in the form of a compound wherein the amount of platinum metal present in the composition is in the range 0.0001 to 1.50% w/w.

11 Claims, 5 Drawing Sheets

Scatter Plot

FISCHER-TROPSCH CATALYST

This application is the U.S. national phase of International Application No. PCT/GB2007/004865, filed 18 Dec. 2007, which designated the U.S. and claims priority to European Application No. 06256435.6, filed 19 Dec. 2006, the entire contents of each of which are hereby incorporated by reference.

The present invention relates to a composition for use after reductive activation as a catalyst for the conversion of gaseous mixtures principally comprising carbon monoxide and hydrogen, hereinafter to be referred to as synthesis gas, to hydrocarbons, in particular to hydrocarbons in the C5-C120 range, to processes for producing the catalyst and to a process utilising the catalyst in the conversion of synthesis gas to the aforesaid hydrocarbons.

BACKGROUND OF THE INVENTION

The conversion of synthesis gas into hydrocarbons by the Fischer-Tropsch process has been known for many years but the process has only achieved commercial significance in countries where unique economic factors prevail. The growing importance of alternative energy sources such as coal and natural gas has focussed renewed interest in the Fischer-Tropsch process as one of the more attractive direct and environmentally acceptable routes to high quality transportation fuels.

Many metals, for example cobalt, nickel, iron, molybdenum, tungsten, thorium, ruthenium, rhenium and platinum are known to be catalytically active, either alone or in combination, in the conversion of synthesis gas into hydrocarbons and oxygenated derivatives thereof. Of the aforesaid metals, cobalt, nickel and iron have been studied most extensively. Generally, the metals are used in combination with a support material, of which the most common are alumina, silica and carbon.

The use of cobalt as a catalytically active metal in combination with a support has been described in, for example, EP-A-127220, EP-A-142887, GB-A-2146350, GB-A-2130113 and GB-A-2125062. EP-A-127220, for example discloses the use of a catalyst comprising (i) 3-60 pbw cobalt, (ii) 0.1-100 pbw zirconium, titanium, ruthenium or chromium, per 100 pbw silica, alumina or silica-alumina, (iii) the catalyst having been prepared by kneading and/or impregnation.

Our earlier patent EP 261870 describes a composition for use after reductive activation as a catalyst for the conversion of synthesis gas to hydrocarbons comprising as essential components (i) cobalt either as the elemental metal, oxide or a compound thermally decomposable to the elemental metal or oxide and (ii) zinc in the form of the oxide or a compound thermally decomposable to the oxide. The resultant catalysts, in contrast to many prior art cobalt-containing catalysts, are more selective to hydrocarbons in the C5-C120 range and can be very selective to a waxy hydrocarbon product. These catalysts may also contain in elemental form or oxide form one or more of the following metals as promoters: chromium, nickel, iron, molybdenum, tungsten, zirconium, gallium, thorium, lanthanum, cerium, ruthenium, rhenium, palladium or platinum suitably in amount up to 15% w/w. Exemplified compositions included chromium, zirconium, gallium and ruthenium as promoters.

U.S. Pat. No. 4,826,800 describes a process for preparing a catalyst comprising cobalt and zinc oxide for use after reductive activation as a catalyst in the conversion of synthesis gas to hydrocarbons. The catalyst is prepared by mixing a solution, of a soluble zinc salt and a soluble cobalt salt with a precipitant such as ammonium hydroxide or ammonium carbonate and recovering the precipitate. The ratio of carbonate to metal is high in the described method, which has been found detrimental to the strength of the catalyst.

U.S. Pat. No. 5,345,005 relates to a Cu—Zn catalyst on alumina for the preparation of alcohols by hydrogenation of e.g. a ketone. In a comparative example, the preparation of a Cu—Zn—Co catalyst on alumina is described, wherein use is made of soda ash. However, the use of soda ash is found to be potentially detrimental to the strength of the catalyst. The particle size distribution range within which 90% of the volume of the Cu—Zn—Co catalyst described in U.S. Pat. No. 5,345,005 lies, is not specified. It is however expected that the use of soda ash in the preparation of the catalyst leads to a broadening in the particle size distribution.

U.S. Pat. No. 5,945,458 and U.S. Pat. No. 5,811,365 describe a Fischer-Tropsch process in the presence of a catalyst composition of a group VIII metal, eg. cobalt, on a zinc oxide support. Such a catalyst is made by first preparing the support by adding a solution of zinc salt and other constituents to an alkaline bicarbonate solution. Next, the precipitate is separated from the bicarbonate solution by filtration to form a filter cake, which can thereafter be dried, calcined and loaded with the group VIII metal. The catalyst material is then formed into tablets, which tablets are crushed to form particles with a size of 250-500 μm, that can be used in a Fischer-Tropsch process. Additional post-treatments such as crushing, are required in order to obtain a catalyst powder with good strength properties. However, the obtained average particle size; as indicated above, is still relatively large. Moreover, crushing results in a broad particle size distribution and catalysts with such a large particle size and a broad particle size distribution tend to be less suitable for processes involving a bubble column, a slurry phase reactor or a loop reactor.

WO-A-01/38269 describes a three-phase system for carrying out a Fischer-Tropsch process wherein a catalyst suspension in a liquid medium is mixed with, gaseous reactants in a high shear mixing zone, after which the mixture is discharged in a post mixing zone. Thus mass transfer is said to be enhanced. As suitable catalysts inter alia cobalt catalysts on an inorganic support, such as zinc oxide are mentioned. The surface area of the support used for the preparation of these known catalysts is less than 100 g/m2. These prior art cobalt based catalysts can be prepared by depositing cobalt on a suitable support, such as a zinc oxide support, by impregnation methodology. Other conventional preparation methods include precipitation routes, which typically involve crushing of a hard filter cake of catalyst material, resulting from the catalyst preparation process, into small particles.

More recently WO 03/090925 describes a Fischer-Tropsch catalyst comprising particles of a cobalt and zinc co-precipitate having specific volume average particle size and particle size distributions. The catalysts essentially consist of cobalt and zinc oxide but may also contain other components commonly employed in Fischer-Tropsch catalysts such as ruthenium, hafnium, platinum, zirconium, palladium, rhenium, cerium, lanthanum, or a combination thereof. When present such promoters are typically used in a cobalt to promoter atomic ratio of up to 10:1.

EP 221598 describes supported catalysts comprising a metal component of iron, nickel or cobalt promoted by zirconium and in addition a noble metal from Group VIII of the Periodic Table. The catalysts are suitable for the preparation of hydrocarbons from carbon monoxide and hydrogen. Preferred noble metals include platinum or palladium and the catalysts are most suitably supported on silica or alumina.

SUMMARY OF THE INVENTION

We have now surprisingly found that compositions comprising cobalt and zinc have improved activity over a wide temperature range compared to prior art compositions for the conversion of synthesis gas to hydrocarbons when promoted by platinum in elemental form or in compound form. In addition the novel catalysts of the present invention exhibit improved methane selectivity. Furthermore, as demonstrated in the examples hereafter, the Applicants have unexpectedly found a huge improvement in the productivity towards the conversion of syngas to hydrocarbons with 5 and more than 5 carbon atoms chain length when using the new catalyst of the present invention.

Thus according to a first aspect of the present invention there is provided a composition for use as a catalyst or catalyst precursor for the conversion of synthesis gas to hydrocarbons said composition comprising (i) cobalt either as the elemental metal, oxide or a compound thermally decomposable to the elemental metal or oxide and (ii) zinc in the form of the oxide or a compound thermally decomposable to the oxide and (iii) platinum in elemental form or in the form of a compound characterised in that the platinum metal is present in the composition in amount in the range 0.0001 to 1.50% w/w.

Preferably the platinum metal is present in amount in the range 0.0001 to 1.00% w/w and most preferably in the range 0.0001 to 0.5% w/w.

Suitably the composition may contain up to 70% cobalt, preferably up to 40% cobalt and most preferably up to 25% cobalt, the remainder of the composition being zinc, oxygen and platinum, the percentages being based on an atomic basis.

The platinum promoter is typically used in a cobalt to promoter atomic ratio of up to 250:1 and more preferably up to 125:1 and most preferably up to 25:1.

The composition may be prepared by a variety of methods including impregnation, precipitation or gelation.

The novel catalysts and catalyst precursors of the present invention may suitably be prepared by co-precipitation of cobalt and zinc ions, wherein an acidic solution comprising zinc ions and cobalt ions and an alkaline solution are supplied to a reactor comprising an aqueous medium, preferably water or an aqueous solution, wherein the acidic solution and alkaline solution are contacted in the aqueous medium and a precipitate comprising cobalt and zinc is formed. The precipitate is thereafter separated from the aqueous medium (which may have formed a slurry together with the precipitate). The separated cobalt and zinc comprising precipitate is then dried and may be post-treated, e.g. calcined, etc., to form said catalyst.

The platinum may be added at one or more of the catalyst preparation stages such as during the co-precipitation as a soluble compound, following the co-precipitation by incipient wetness impregnation or following the post treatment of the cobalt and zinc comprising precipitate.

The combination of acidic solution and alkaline solution is preferably chosen such that the components of the acidic solution and of the alkaline solution are soluble in the aqueous medium, but that the cobalt and zinc precipitate when they are contacted with the alkaline solution, while the counter ions of zinc, cobalt and optionally the counter ions of platinum substantially remain in solution. The skilled professional will know how to choose appropriate conditions, such as the type of counter ions and the concentrations for each of the components.

Preferably the precipitation of particles is carried out at a substantially constant pH, in particular at a pH value varying at most 0.2 pH units around a set-paint value. Thus it has been found possible to make a catalyst precursor with very favourable free flowing characteristics.

Preferably, the alkaline solution and the acidic solution are supplied to the reactor simultaneously (from separate conduits).

The catalyst or catalyst precursor may alternatively be obtained by impregnation of a suitable cobalt and platinum compound either in a single impregnation or using multiple impregnation steps.

Optionally the cobalt in the isolated and dried precipitate or in the calcined product is reduced to metallic cobalt.

Suitable sources for ionic zinc and ionic cobalt include salts thereof that are soluble in the acidic solution and in water in a sufficient concentration. Preferred examples of such salts include zinc nitrate, cobalt nitrate, zinc acetate, cobalt acetate and other inorganic or organic salts of cobalt and zinc that have a similar solubility in the acidic solution.

Suitable components for co-precipitating with the cobalt ions and zinc ions present are inorganic salts and organic salts that are soluble in an aqueous alkaline solution in a sufficient concentration, such as hydroxides, carbonates, urea, isocyanates and any other salt that can be used as base source and that can be dissolved water in the alkaline solution. Preferred examples of such salts include ammonium carbonate, ammonium bicarbonate and other inorganic or organic salts of carbonate that have at least a similar solubility in the alkaline solution.

Preferably, the total concentration of zinc and cobalt ions in the aqueous medium is chosen in the range of 0.1 to 5 moles/litre. The concentration is preferably kept within this range throughout the precipitation step.

The pH of the acid solution is preferably in the range of 1-5. The pH of the alkaline solution is preferably in the range of 6-14. The pH in the aqueous medium (wherein the co-precipitation takes place) is preferably in the range of 4-9, depending upon the type of precursor salts used as a source for cobalt, zinc and alkaline component (s).

The temperature during the co-precipitation process is preferably chosen in the range of 5-98 C, more preferably in the range of 15-75 C.

Irrespective of whether the composition is prepared by impregnation, precipitation or co-precipitation or by any other method, it is preferred to carry out one or more additional steps before the composition is used as a catalyst. Thus it is preferred to calcine the composition, suitably by heating it in, for example, a stream of gas such as nitrogen or air at a temperature suitably in the range from 250 to 600° C.

The platinum metal promoter may be introduced at any stage in the production of the composition, for example during the precipitation step or post-impregnation.

The platinum metal may be introduced into the catalyst precursor in elemental form or in the form of a compound. Suitable platinum precursor-containing compounds include for example $(NH_4)_4Pt(OH)_2$, $Pt(NH_3)_4(NO_3)_2$, $(NH_3)_2PtCl_2$, $Pt(acetate)_2$, $(NH_4)_2PtCl_6$ and similar. The platinum precursor-containing compound is preferably soluble in water but alternatively may be soluble in an organic solvent such as platinum acetyl acetonate soluble in acetone.

The catalyst compositions may suitably be activated by reduction for example by contact at elevated temperature with a reducing gas, for example hydrogen, which may be diluted with nitrogen. Typically the conditions employed during the reductive activation step may suitably be at a pressure in the range from 1 to 100 bar and a temperature in the range 150° C. to 500° C. for a period of up to 24 hours or longer.

Although it is preferred to effect the reductive activation step as a discrete step prior to use as a catalyst for the conversion of synthesis gas it may be incorporated into the synthesis gas conversion process.

In another aspect the present invention there is provided a process for the conversion of synthesis gas to hydrocarbons which process comprises contacting synthesis gas under conditions of elevated temperature and atmospheric or elevated pressure with a reductively activated catalyst composition as hereinbefore described.

Synthesis gas principally comprises carbon monoxide and hydrogen and possibly also minor amounts of carbon dioxide, nitrogen and other inert gases depending upon its origin and degree of purity. Methods of preparing synthesis gas are established in the art and usually involve the partial oxidation of a carbonaceous substance, e.g. coal. Alternatively, synthesis gas may be prepared, for example by the catalytic steam reforming of methane. For the purpose of the present invention the carbon monoxide to hydrogen ratio may suitably be in the range from 2:1 to 1:6. Whilst the ratio of the carbon monoxide to hydrogen in the synthesis gas produced by the aforesaid processes may differ from there ranges, it may be altered appropriately by the addition of either carbon monoxide or hydrogen, or may be adjusted by the so-called water gas shift reaction well known to those skilled in the art.

The elevated temperature may suitably be in the range from 160 to 350° C., preferably from 180 to 250° C. The pressure may suitably be in the range from 0 to 100 bar, preferably from 10 to 50 bar. The GHSV for continuous operation may suitably be in the range from 100 to 25000 L/L/h.

The process may be carried out batch wise or continuously in a fixed bed, fluidised bed or slurry phase reactor.

When using the catalyst in a fixed bed process the particle size should be of such shape and dimension that an acceptable pressure drop over the catalyst bed is achieved. A person skilled in the art is able to determine the particle dimension optimal for use in such fixed bed reactors. Particles of the desired shape and dimension may be obtained by extrusion of a slurry to which optionally extrusion aids and/or binders may be added.

Thus the present invention further relates to the use of a catalyst according to the invention in a slurry reactor, a loop reactor or a fluid bed reactor. The present invention further relates to the use of a catalyst according to the invention in a Fischer-Tropsch process.

The catalysts of the present invention have also surprisingly been found to exhibit improved methane selectivity ie. the conversion of synthesis gas to methane is reduced compared with the catalysts of the prior art.

The present invention will now be illustrated by use of the following examples.

EXAMPLES

Catalyst Synthesis

The promoted catalysts were prepared according to the following general method as follows:

Base Co—ZnO Catalyst Preparation

The general preparation procedure for the co-precipitated Co—ZnO catalyst precursors is as follows The required amount of each reagent was weighed into a clean beaker. An amount of de-ionized water was added and stirred with a clean glass rod until the reagent was totally dissolved. When the temperature of the solution in the beaker reached room temperature, the solution was poured from the beaker to a volumetric flask. The inner walls of the beaker and the glass rod were washed with de-ionized water (or other solvent) at least three times, and the washing solution was transferred to the volumetric flask. The volumetric flask was thoroughly shaken. De-ionised water was added to the volumetric flask to the graduated mark. The solution was transferred to a labeled solution bottle and the total weight of the bottle and the solution was recorded.

The nominal concentration of $Zn(NO_3)_2.6H_2O$ was 0.67 M/L, and pH=3.50±0.05. The nominal concentration of $Co(NO_3)_2.6H_2O$ was 0.34 M/L, and pH=5.75±0.05. The $Zn(NO_3)_2.6H_2O$ solution, the $Co(NO_3)_2.6H_2O$ solution and de-ionised water were mixed to prepare a solution of $Zn(NO_3)_2.6H_2O$ and $Co(NO_3)_2.6H_2O$. The nominal concentrations of $Zn(NO_3)_2.6H_2O$ and $Co(NO_3)_2.6H_2O$ in 900 ml of the combined solution was 0.410 M/L (109.74 gr) and 0.100 M/L (26.18 gr), respectively, and pH=4.00.

Of the mixed solution, a weight of 690.8 g (approximately 900 ml) was measured for each co-precipitation. $NH_4HCO_3$ was dissolved in de-ionised water to prepare an aqueous solution of $NH_4HCO_3$, the nominal concentration of $NH_4HCO_3$ was 1.36 M/L (194 gr in 1800 ml). A total of 1800 ml of the base solution was used for each co-precipitation. The base was added at a rate of 30 ml/min while stirring at 500 rpm to the metal solution to give a pink precipitate. The precipitate was isolated by centrifugation of approximately 500 ml volumes at 3000 rpm for 2 minutes.

A watch glass with the co-precipitated catalyst sample was placed in an oven and dried at 80° C. for about 8 h. The sample was ground into a fine powder and the powder was further dried. at 150° C. for 16 h.

Catalyst Calcination

The obtained catalyst precursors were calcined according to the following procedure.

Weighted catalysts (about 11 g) were placed into calcination tubes made of pyrex glass. The air flow rate was set at 375 mL/min for each calcinations tube and the tube flushed for 30 minutes. The furnace was heated at 2° C./min from room temperature to 450° C. while maintaining the air flow rate at 375 ml/min. The temperature was held at 450° C. for six hours while maintaining the air flow rate at 2500 ml/min. The oven was left to cool to room temperature with the air flow rate set at 1000 ml/min. The obtained catalysts were discharged from the tube furnace to sealed bottles.

Catalyst Impregnation

Promoted catalysts were prepared according to the following method.

Water uptake of the catalyst precursor to be impregnated was determined as follows. A weighted amount of Co—ZnO catalyst precursor obtained by co-precipitation after drying (W1) was taken. De-ionized water was added to the beaker, while stirring the sample, until the Co—ZnO was fully wetted, but there was no more liquid remaining; the weight of the wetted sample and beaker was determined (W2). The water adsorption ratio was determined to be (W2/W1)×100%

A weighted promoter compounds was dissolved in de-ionised water which was calculated based on the water adsorption ratio and the amount of Co—Zn catalyst precursor. The Co—ZnO catalyst precursor was added to the promoter solution while stirring with a glass rod. After the impregnated carrier had been stirred at room temperature for 5 minutes, the impregnated carrier was dried under an infra-red lamp, while stirring until the material was completely dry.

The table below gives the promoter precursors and weights of promoter precursors used to prepare the promoted catalysts.

|  | Catalyst A | Catalyst B |
|---|---|---|
| Precursor[a] | $(NH_4)_4Pt(OH)_2$ | $(NH_4)_4Pt(OH)_2$ |
| Metal (w/w)[b] | 0.0909 | 0.0909 |
| Amount (g)[c] | 1.985 | 4.963 |
| Metal used (g)[d] | 0.180 | 0.451 |
| Metal used (mmol)[e] | 0.925 | 2.313 |
| Promoter (mmol/100 g)[f] | 2.0 | 5.0 |
| Promoter (% w/w)[g] | 0.39 | 0.98 |

All impregnations were done on 62.5 grams of un-calcined base catalyst.
[a]The Pt precursors used were dissolved in water to obtain the stock solution.
[b]Metal content in % w/w in the precursor solution used to make the stock solution..
[c]Amount of precursor solution used.
[d]Amount of promoter metal (calculated to be present as elemental metal) used for the impregnation.
[e]mmol of metal used for impregnation.
[f]mmol of Pt metal in the calcined catalyst precursor, calculated based on a reduction to 74% of the initial catalyst precursor weight after calcinations.
[g]Weight percentages are calculated based on promoter metal on un-reduced Co—ZnO precursor after calcination.

Catalyst Pressing

The catalyst powders were pressed into pellets at a pressure of 6 ton on a die with a diameter of 32 mm for 5 min. The obtained pellet were crushed, sieved, and the 20-40 mesh grains were collected for catalytic testing.

Experimental Conditions

Catalysts were loaded in a fixed bed testing reactor as diluted catalysts. The bed dilutions were used to control exotherms in the catalyst. The bed dilutions used were Diluent/Catalyst=3/1 (GHSV=1250/hr); 8/1 (GHSV=0.2500 L/L/hr.).

Total catalyst bed volumes were 2 ml (including the diluent). The catalysts were activated using the following procedure:

Drying: $N_2$ at GHSV=2000 L/L/hr at P=1 atm was passed over the catalyst bed while the temperature was raised from room temperature to 120 C with a ramp rate of 300 C/hr. At 120 C the temperature was held for 15 mins.

Activation: A mixture of 50/50% v/v $H_2/N_2$ was passed over the catalyst bed at P=1 atm and the temperature was raised from 120 C to the activation temperature with a ramp rate of 180 C/hr at the target temperature the temperature was held for 15 hours before cooling to 90 C.

Syngas: At 90 C the $H_2/N_2$ mixture was replaced by a syngas mixture of composition 55.5/26.5/18=H2/CO/He at a flow of GSHV=1250, 2500 L/L/hr and P=30 bar the temperature was raised from T=90 C to T=170 C at a ramp rate of 30 C/hr the ramp rate was then reduced to 5 C/hr and further reduced to a ramp rate of 2 C/hr for the last 4 C.

Each catalyst was tested at two temperatures (T=180 C and T=195 C) for a duration of 150 hours. Exit gasses were sampled by on-line GC and analysed for gaseous products. The He was used as an internal standard, the $C_{5+}$ productivity is determined by difference from the $C_1$-$C_4$ components in the gas phase.

Catalyst Activity

The enclosed five Figures below represent a comparison between the catalysts of the invention and a reference catalyst. The said reference catalyst was tested twice as reflected in the figures. Addition of Pt as a promoter to Co—ZnO increases the catalyst activity significantly. The figures below show the increased CO Conversion for the Pt-promoted catalysts relative to a reference catalyst under the same testing conditions.

All examples used the following experimental conditions: the gas throughput was 2500 L/L/hr, the pressure was 30 bar, the feed gas composition was He/$H_2$/CO=18/55.5/26.5% v/v. Data points were taken at approximately 150HOS Each figure compares two catalysts reduced at three different temperatures. The black symbols indicate a run temperature of 195 C the white symbols indicate a run temperature of 180 C. The catalysts are indicated by the shape of the symbols: square=un-promoted catalyst, triangle=0.39% w/w Pt-promoted (Catalyst A) and circle=0.98% w/w Pt-promoted (Catalyst B). It is clear that for all conditions the Pt-promoted catalysts show better performance in terms of CO conversion.

Figure 1:
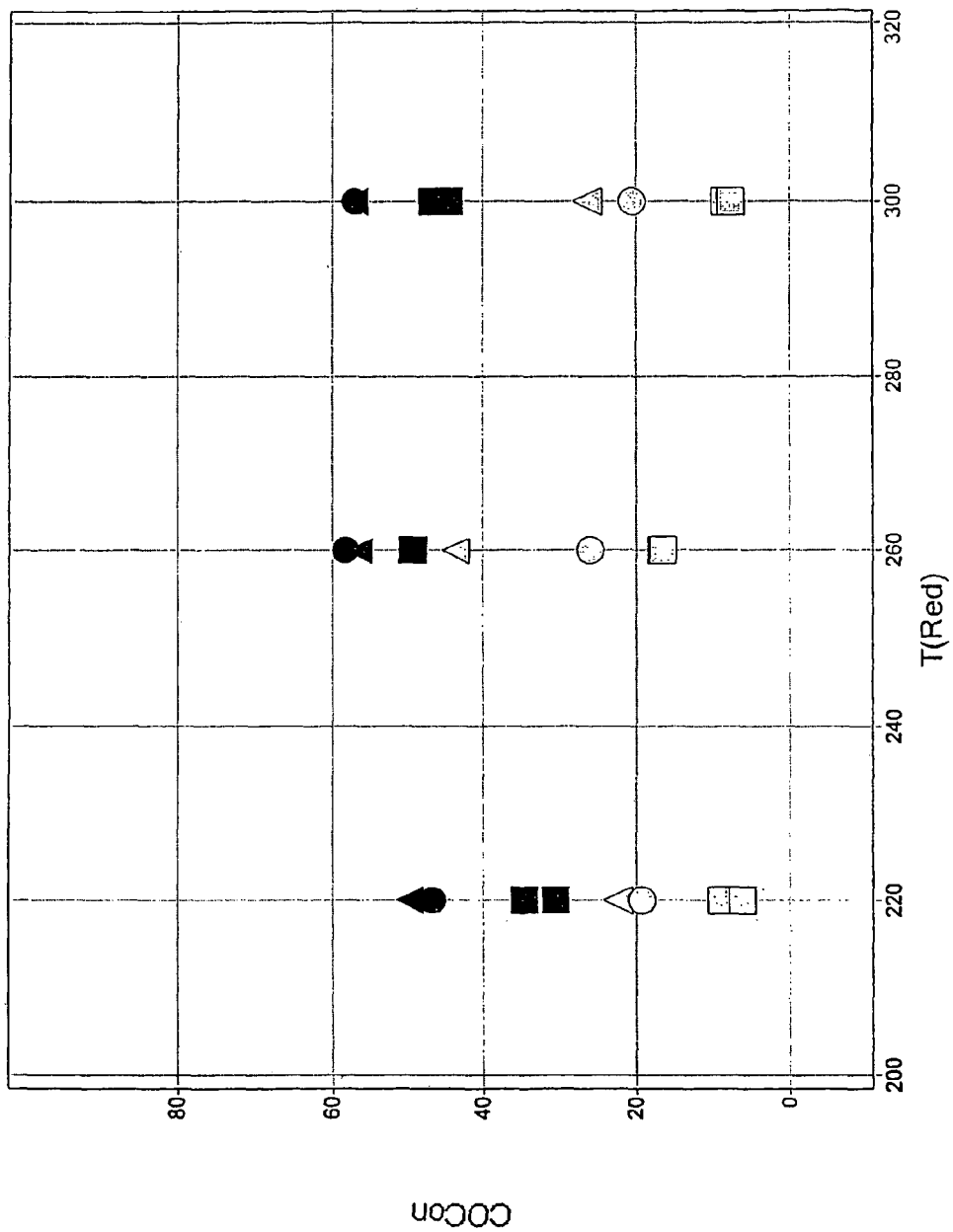
FIG. 1 shows the increased activity of the catalysts of the invention as a function of reduction temperature.
Figure 2:
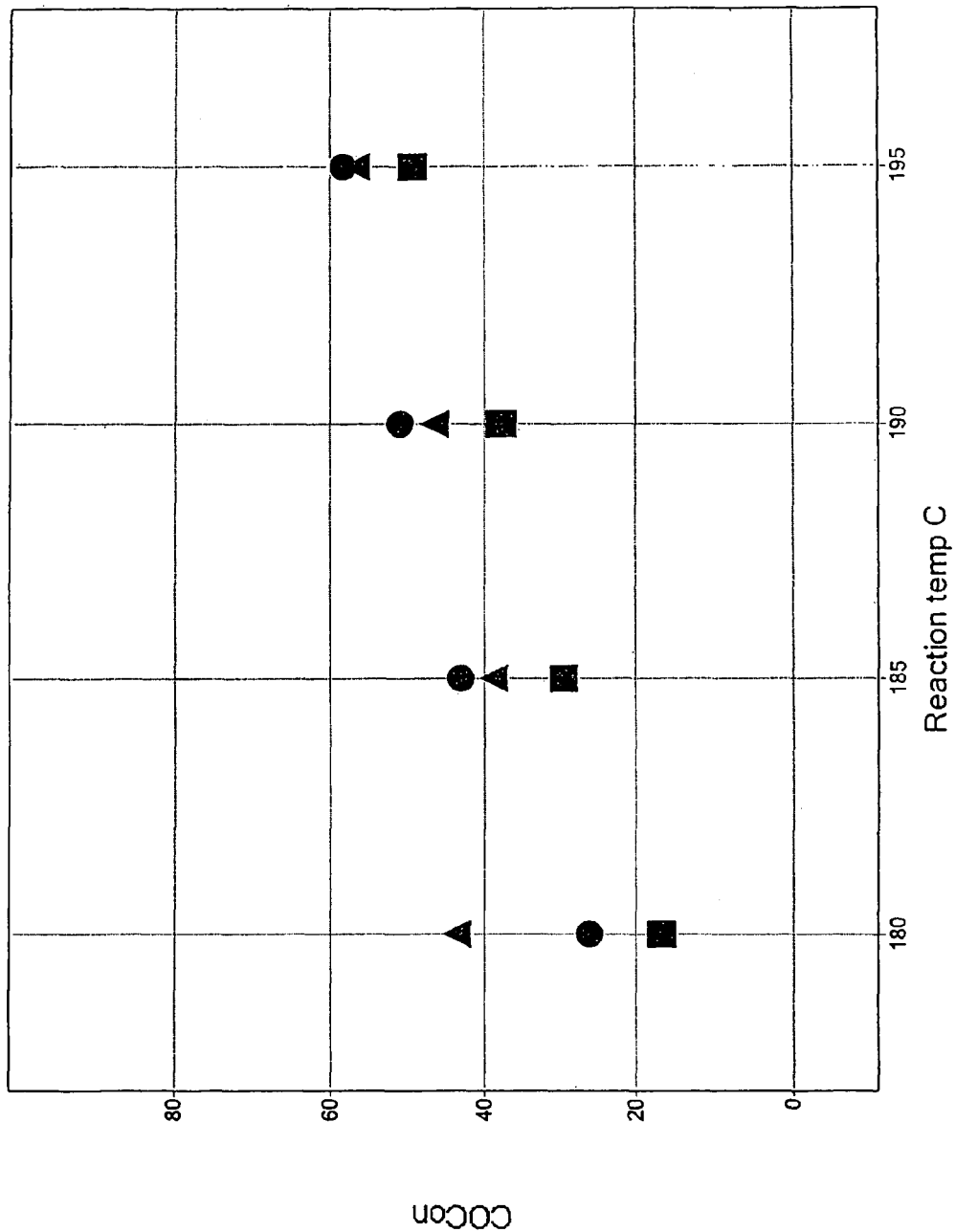
FIG. 2 shows the increased activity of the catalysts of the invention as a function of reaction temperature.

FIG. 2 shows the increased activity of the same Pt-promoted catalysts (Triangle and Circle) versus the un-promoted catalyst (Square) as a function of reaction temperature when catalyst precursors are reduced at T=260° C.

Methane Selectivity

The $CH_4$ selectivity was examined to determine if the catalysts of the invention showed any changes from the established Schultz-Flurry distribution as observed for the un-promoted catalyst.

For the Pt promoted catalysts there is a clear improvement in the $CH_4$ selectivity with respect to the reference catalyst which in this context means a reduced selectivity.

Figure 3:
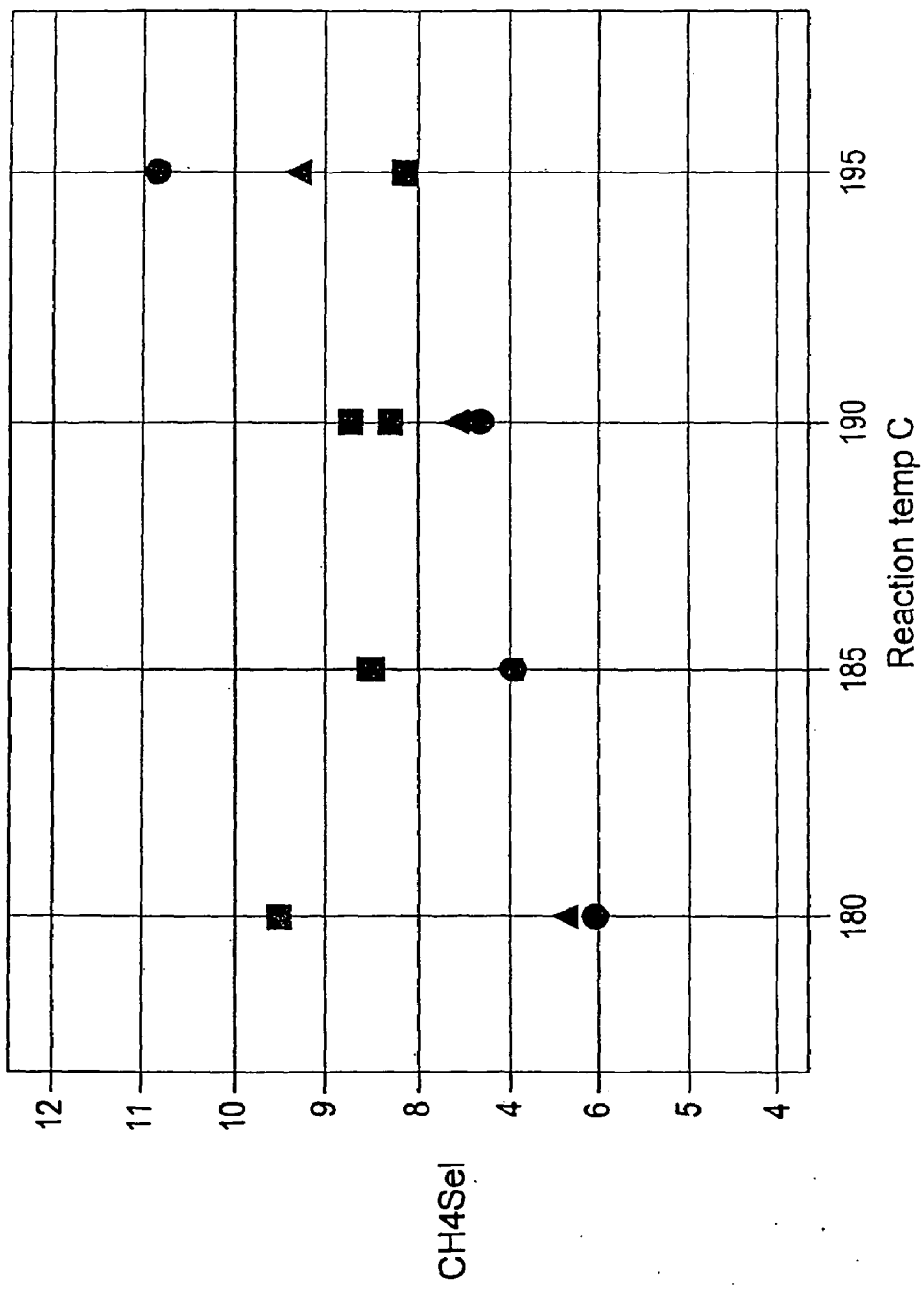
FIG. 3 is a plot of the Pt-promoted catalysts as a function of temperature at GHSV =1250 L/L/hr.
Figure 4:
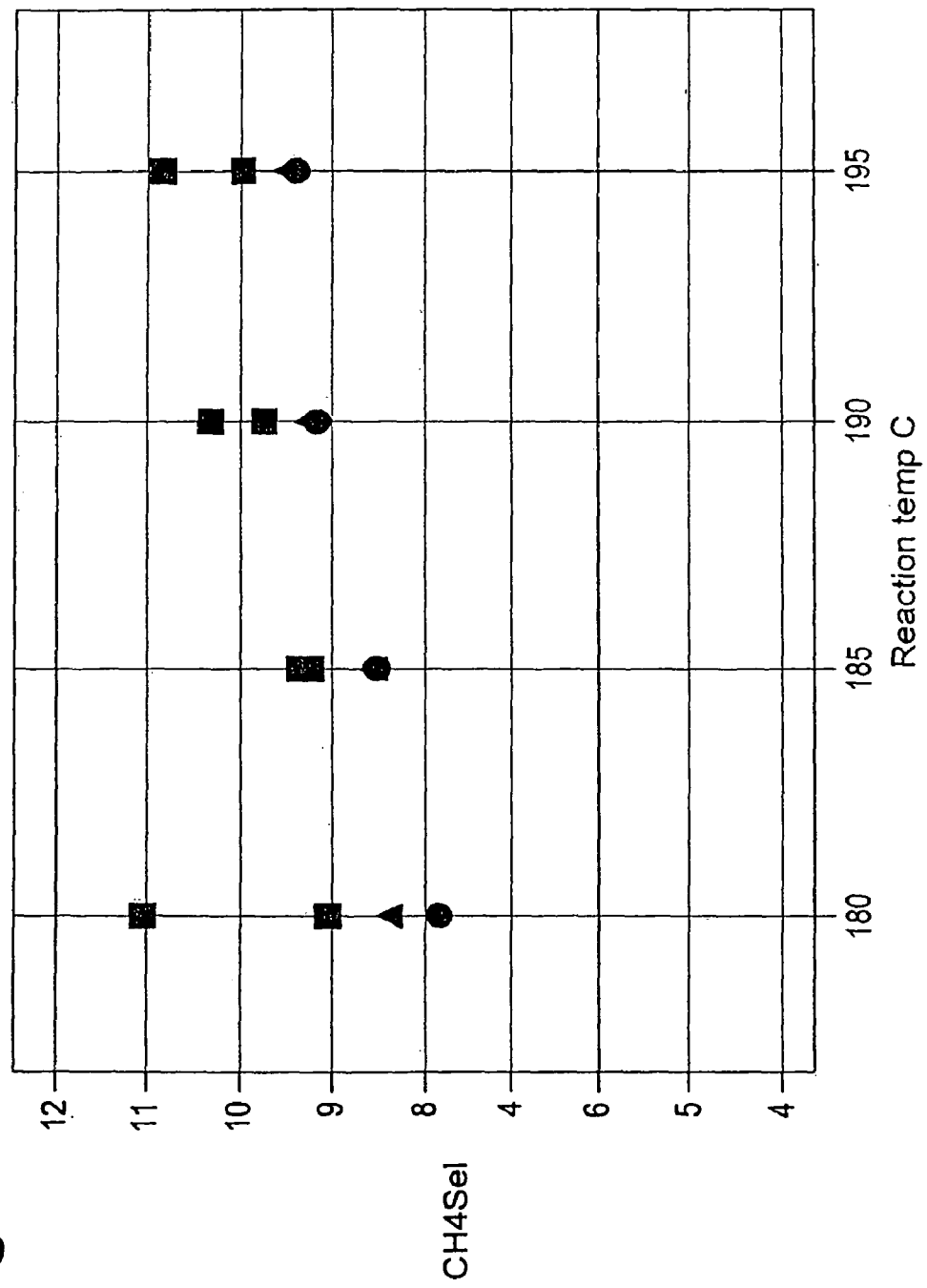
FIG. 4 is a plot of the Pt-promoted catalysts as a function of temperature at GHSV =2500 L/L/hr.

The figures below plot the Pt-promoted catalysts as a function of temperature at GHSV=1250 L/L//hr (FIG. 3) and GHSV=2500 L/L//hr (FIG. 4). In each plot the catalyst was activated at 220° C. Again the catalysts are indicated by the shape of the symbols: square=un-promoted catalyst, triangle=0.39% w/w Pt-promoted (Catalyst A) and circle=0.98% w/w Pt-promoted (Catalyst B). The lower methane selectivity for the platinum promoted catalyst is clearly demonstrated.

Figure 5:
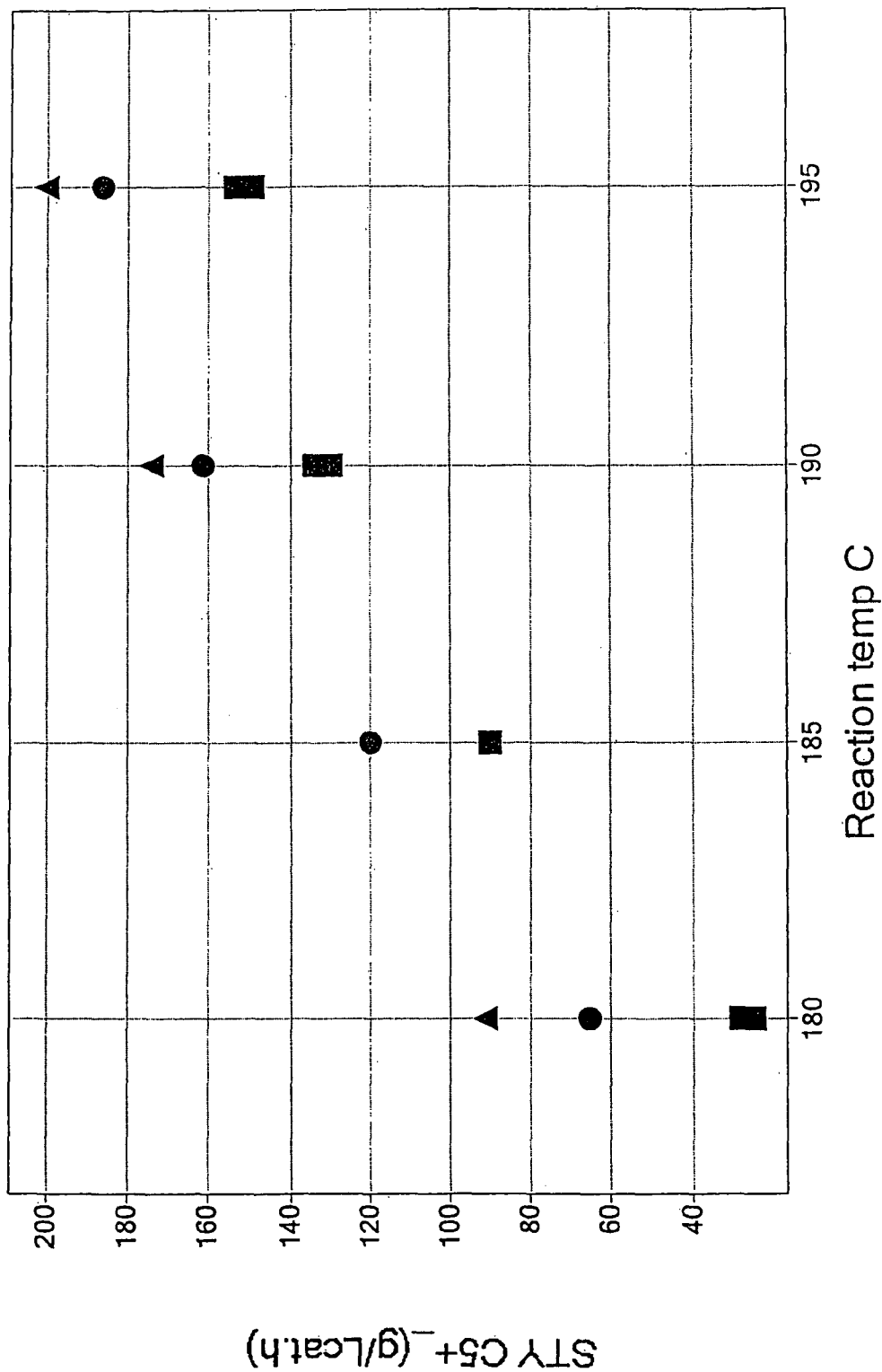
FIG. 5 shows the productivity in (g/L/hr) of the 300° C. activated catalysts as a function of operating temperature. temperature.

FIG. 5 below shows the productivity in (g/L/hr) of the 300° C. activated catalysts as a function of operating temperature. It can be clearly seen that the productivity of the invention catalysts to the desired product (C5 and C5+ hydrocarbons) is much higher throughout the operating temperature range. The productivity of the catalyst is defined as the weight in grams of products containing 5 carbon atoms or more, formed over the catalyst per litre of packed catalyst volume per hour of reaction time.

The invention claimed is:

1. Process for reducing the methane selectivity in a Fischer-Tropsch conversion of syngas to hydrocarbons, said process comprising the step of using a catalyst composition which comprises:
   (i) cobalt, either as the elemental metal, oxide, or a compound thermally decomposable to the elemental metal or oxide; and
   (ii) zinc, in the form of the oxide or a compound thermally decomposable to the oxide; and
   (iii) platinum, in the elemental metal form, or in the form of a compound wherein the amount of platinum metal present in the composition is in the range 0.0001 to 1.50% w/w.

2. Process according to claim 1 wherein the platinum metal is present in an amount in the range 0.0001 to 1.00% w/w.

3. Process according to claim 1 wherein the composition contains up to 70% cobalt, the remainder of the composition being zinc, oxygen and platinum, the percentages being based on an atomic basis.

4. Process according to claim 1 wherein the cobalt to platinum atomic ratio is of up to 250:1.

5. Process according to claim 1 wherein the catalyst composition comprises cobalt, zinc oxide and platinum.

6. Process according to claim 2 wherein the platinum metal is present in an amount in the range 0.0001 to 0.5% w/w.

7. Process according to claim 3 wherein the composition contains up to 40% cobalt.

8. Process according to claim 3 wherein the composition contains up to 25% cobalt.

9. Process according to claim 3 wherein the composition contains up to 15% cobalt.

10. Process according to claim 4 wherein the cobalt to platinum atomic ratio is of up to 125:1.

11. Process according to claim 4 wherein the cobalt to platinum atomic ratio is of up to 25:1.

* * * * *